United States Patent [19]

Carlisle

[11] 4,128,356
[45] Dec. 5, 1978

[54] FRICTIONAL COUPLING DEVICE

[76] Inventor: Richard S. Carlisle, P.O. Box 307, Rye, N.Y. 10580

[21] Appl. No.: 745,067

[22] Filed: Nov. 26, 1976

[51] Int. Cl.$^2$ ............................................. F16B 7/00
[52] U.S. Cl. ..................................... 403/292; 70/457; 402/26
[58] Field of Search ..................... 70/457, 458, 459; 24/206 A, 16 R, 16 PB, 38, 31 B, 31 C; 403/292, 298, 293, 280; 402/26

[56] References Cited

U.S. PATENT DOCUMENTS

| | | | |
|---|---|---|---|
| 1,704,927 | 3/1929 | Taylor | 403/292 |
| 3,309,096 | 3/1967 | Inka | 403/292 |
| 3,605,205 | 9/1971 | Peterson | 403/292 |

Primary Examiner—Kenneth J. Dorner

[57] ABSTRACT

A coupling device is described and formed of a flexible tubular outer connecting element and a more rigid insert element sized to snugly fit into the bore of the connecting element. The elements are formed of vinyl material of different hardness so that their connection is accompanied with high frictional surface engagement. The resilience of the outer connecting element is selected sufficiently high to contract slightly and more tightly grip the insert in response to a separating force while facilitating connection with a slight expansion in response to a compressional connecting force applied to the elements. In one embodiment a ring fastener is formed for use as a key ring, or loose-leaf paper binder, apparel fastener and the like. Several embodiments are described.

25 Claims, 13 Drawing Figures

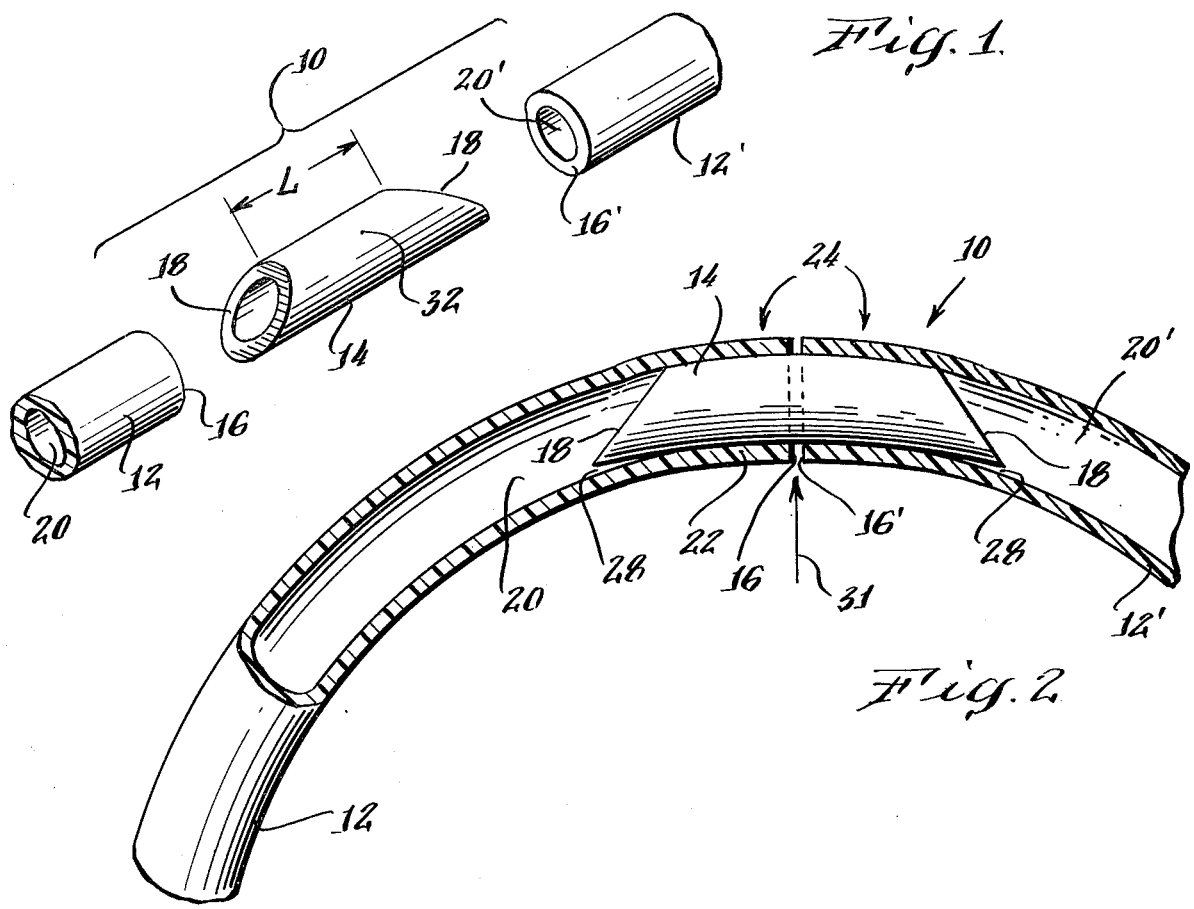
Fig. 1.
Fig. 2.
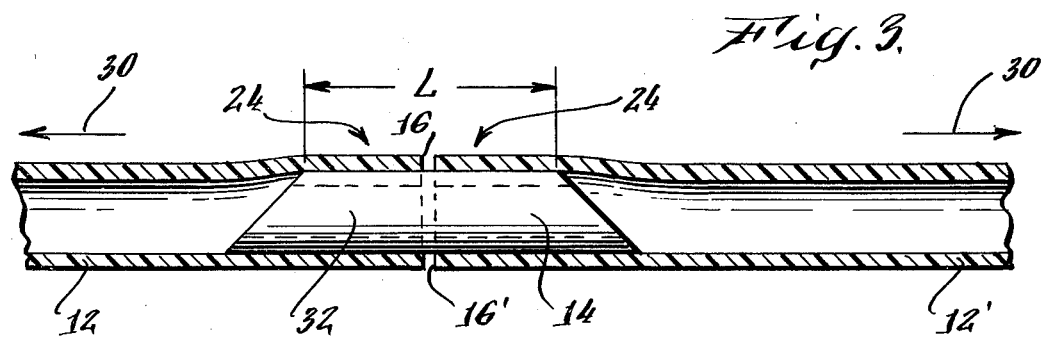
Fig. 3.
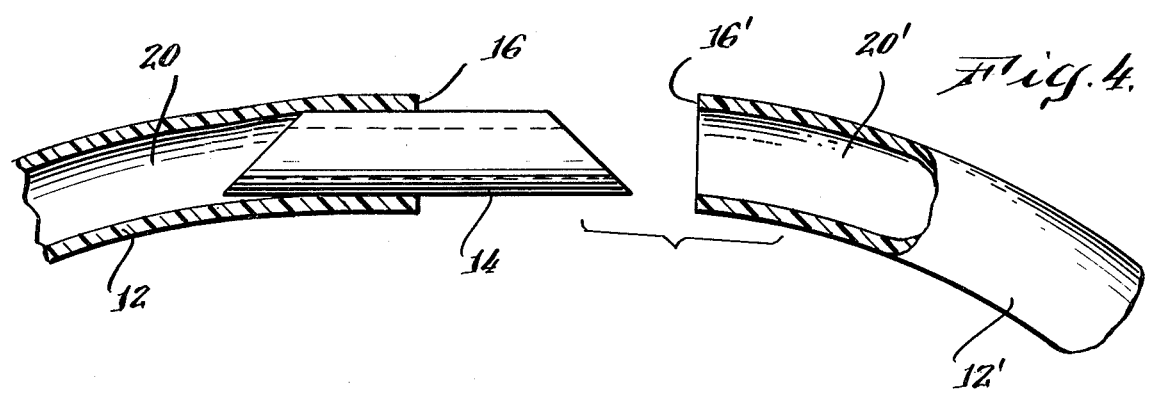
Fig. 4.

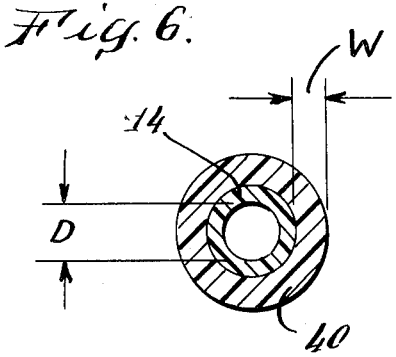
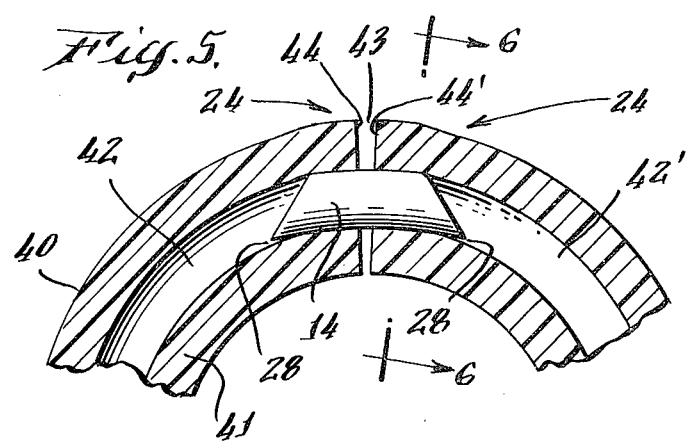
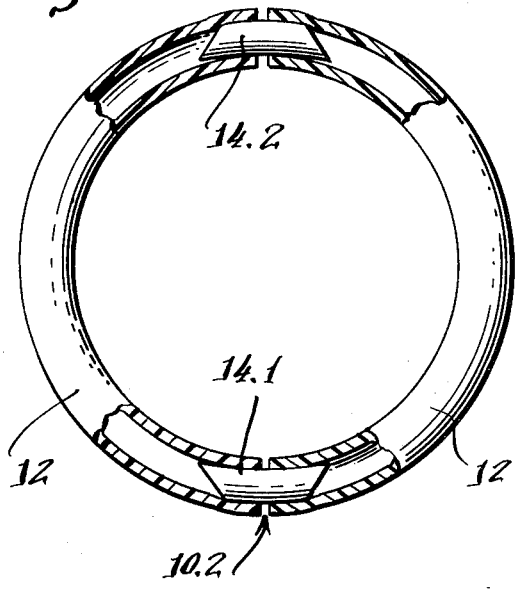
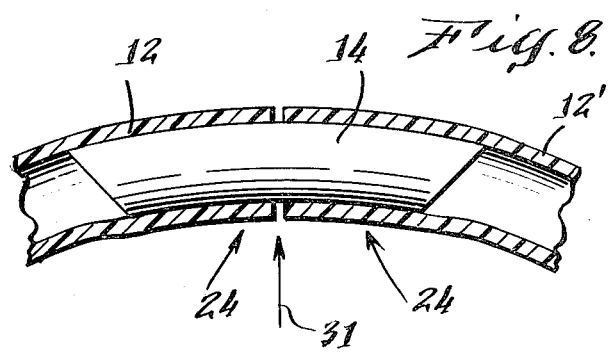
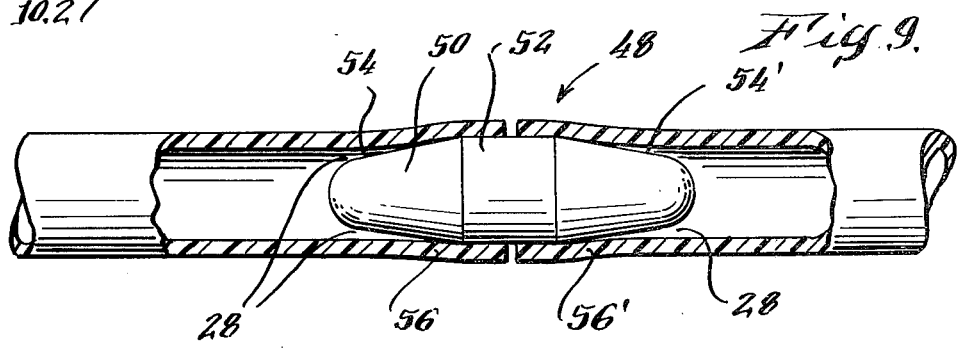
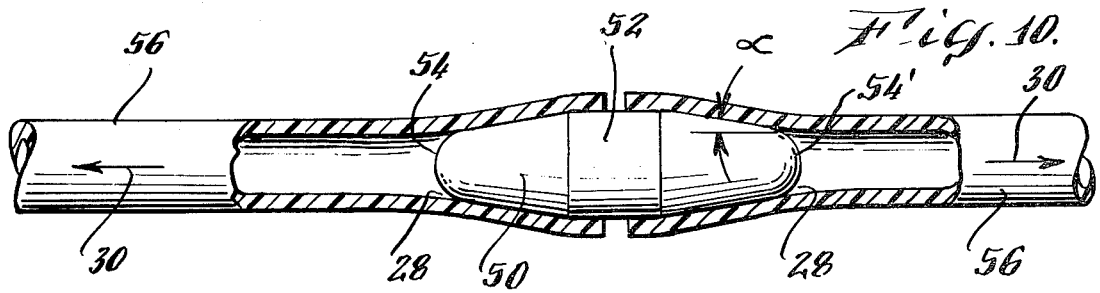

FRICTIONAL COUPLING DEVICE

BRIEF DESCRIPTION OF THE INVENTION

This invention relates to a coupling device for use as a toy, key ring, loose-leaf paper binder, jewelry coupler, apparel fastener and the like. More specifically, this invention relates to a friction coupling device.

BACKGROUND OF THE INVENTION

A well-known coupling toy, known as a chinese finger, employs a net-like woven structure which expands transversely due to compression when coupling engagement is made and contracts transversely when a pull-apart force is applied. It is also well known to connect a flexible tube to a rigid metal tube. Another coupling of interest is the paper file described in U.S. Pat. No. 828,974 to Schmidmer wherein a rigid U-shaped metal insert fits into upwardly extending springs. In U.S. Pat. No. 3,263,444 to DiCroce, a finger ring is described wherein a polyethylene insert-coupling, having a compressible enlarged end, is insertable into a comparably shaped recess of a metal ring.

SUMMARY OF THE INVENTION

In one form of a coupling device in accordance with the invention a longitudinal connecting element is used and formed of a flexible, at least partially resilient and stretchable, material which has a bore at least at one end. A longitudinal inner insert element is provided with a shape selected to frictionally engage the wall surrounding the bore of the connecting element. The insertion of the inner element into the bore is achieved with greater ease than their separation to provide a convenient coupling device. When another end of a connecting element is applied over the insert, the two ends are held together with great effectiveness.

When the outer connecting and inner insert elements are formed of a plastic material such as vinyl, a particularly effective coupling is achieved whereby the connecting element is conveniently moved over the insert while requiring a substantially greater separation force.

The operation of the coupling device is enhanced when its vinyl plastic components are formed of lower and higher hardness. In this manner a softer resilient connecting element permits an elongation during assembly and contraction against the harder insert element when a pull-apart force is applied. Since both elements have smooth vinyl surfaces, which have a high affinity for each other, a strong coupling is obtained.

A coupling device in accordance with the invention is advantageously employed to make a separable ring by employing a longitudinal vinyl tube as the connecting element with sufficient softness and resilience to frictionally grip a harder, less pliable and less stretchable and shorter insert element placed in the ends of the tube. The completed ring is primarily formed by the outer and softer connecting element.

With another coupling device in accordance with the invention, a more rigid ring is formed by using a relatively rigid vinyl insert element which has sufficient length to bend into a ring and whose ends frictionally enter a shorter and softer vinyl tubular outer connecting element.

The convenience of the push-on, pull-off coupling device in accordance with the invention can be further appreciated when used in an application such as a clothing fastener. For example, a pair of vinyl tubular connecting elements can be fastened to opposite sides of the closing edges of a garment. Vinyl inserts mounted in respective ends of one connecting element are easily pushed into the ends of the other connecting element to close the garment.

The ease with which a coupling device in accordance with the invention can be closed can be appreciated particularly in comparison with the degree of difficulty of opening the coupling device. The flexibility of the outer connecting element enhances this effect in that the pull-apart force applied, for example, to opposite sides of a ring tends to be shared between the coupling and the portion of the connecting element opposite the coupling.

The coupling device can be advantageously formed of commonly available hollow, light-weight tubular material cut to desired lengths. The inner insert's external diameter is then selected to snugly fit into the through-bore of the external connecting element. The length of the insert is selected to achieve the desired frictional coupling with sufficient separation force to form a desired coupling. The resultant coupling can be economical and practically employed in many applications.

When a tubular form of a coupling device of this invention is opened, i.e one end of the outer connecting element is pulled off the insert, the latter unexpectedly remains frictionally retained by the other end of the connecting element substantially at the insert's normal fully inserted position. This adherence is particularly effective with vinyl materials and enables use of relatively short inserts.

It is, therefore, an object of the invention to provide a convenient, simple and practical coupling device. It is a further object of the invention to provide an economical, push-on pull-off coupling device for use in many applications.

These and many other objects and advantages of the invention can be understood from the following description of several coupling device embodiments described in conjunction with the drawings.

THE DRAWINGS

FIG. 1 is a partial perspective view of an unassembled coupling device in accordance with the invention;

FIG. 2 is a partial circumferential section of an unassembled and connected coupling device in accordance with the invention;

FIG. 3 is a partial circumferential section view of the coupling device of FIG. 2 with a separating force being applied;

FIG. 4 is a partial circumferential section view of the coupling device of FIG. 3 after disconnection;

FIG. 5 is a partial circumferential section view of a coupling device employing a highly bent, thick-walled connecting element;

FIG. 6 is a radial section view of the coupling device of FIG. 5;

FIG. 7 is a partial section circumferential view of a ring formed with multiple coupling devices of this invention;

FIG. 8 is a partial section view of the assembled and connected coupling device with an insert having a different orientation;

FIG. 9 is a partial section view of an assembled and connected coupling device employing a selectively shaped insert;

FIG. 10 is a partial section view of the coupling device shown in FIG. 9 while being subjected to a pull-apart force;

DETAILED DESCRIPTION OF EMBODIMENTS

Figure 12:
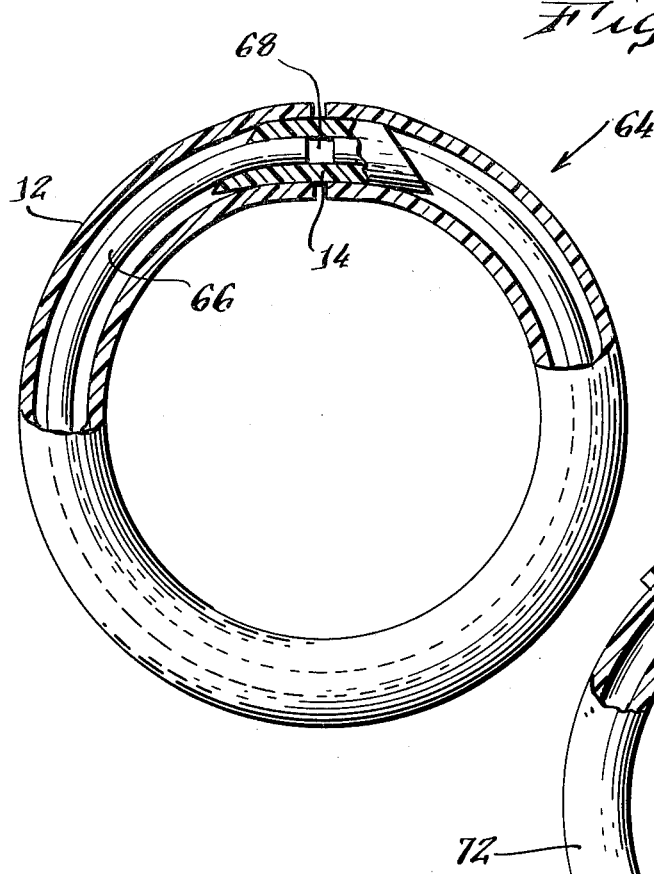
FIG. 12 is a partial circumferential section view of another embodiment for a coupling device in accordance with the invention.

With reference to FIG. 1, a portion of the coupling device 10 is shown formed of a connecting element 12 and an insert element 14. The connecting element 12 can be a singular piece, which has its ends 16 bent around to form a ring to engage the insert 14 at its opposite ends 18—~'. Alternatively, the connecting element 12 can be a two-piece part with each piece provided with a suitably shaped end 16 to engage the insert 14. The ends 16 of the connecting element 12 are provided with a bore 20 sized to snugly receive the insert 14. As will be described further in detail, the connecting element 12 can be formed of tubular material with a through bore sized to receive insert 14.

The insert 14 is shown as a tubular section with inclined end surfaces 18 which are beveled relative to the longitudinal axis of the insert. The beveled ends 18 facilitate entry into the bores 20 of the connecting elements 12 as illustrated in FIG. 2. The insert 14 partially extends into each end of the through bore 20 of a single connecting element 12 and snugly engages the wall 22 of the bore 20 to form a tight frictional engagement therewith. The materials and sizing of the insert 14, bore 20 and connecting element wall 22 surrounding the bore 20 are so selected that assembly of the coupling device 10 is accomplished by a simple push-on effort.

The assembled coupling device 10 for a ring, as shown in FIG. 2, illustrates the relative hardness between the insert 14 and connecting element 12. The softer, outer connecting element 12 is slightly expanded at 24 by the insert 14. This assures a tight frictional grip between the insert 14 and connecting element 12. The harder insert 14 has sufficient firmness to withstand the compressive action of the expanded segment 24 of the connecting element. Although the vinyl insert 14 bends slightly with the ring curvature of the connecting element 12, the insert does not completely conform as shown by the small gaps 28 between the insert ends 18 and the wall 22.

The pulling apart of the connected coupling device 10 involves a force which exceeds that needed to assembly. This is illustrated in the view of FIG. 3 wherein the connecting element 12 is shown slightly elongated as a result of a longitudinal separating force as suggested by arrows 30. Gaps 28 disappear due to straightening of element 12 when pulled as described. This increases surface contact area and coupling tensile strength. The pull-apart force causes a very slight decrease of the transverse dimension of the softer connecting element 12 whose inwardly directed or contracting force profoundly increases the frictional gripping between the elements. Due to intersurface affinity, the increase of the frictional grip is suprisingly great.

When the connecting element 12 and insert 14 are each formed of a plastic material such as vinyl, their surfaces have strong affinity for each other so that the pull-apart force required to disconnect the coupling device 10 is considerably greater than that required to connect. With vinyl materials the release force exceeds the connecting force by a factor of about two and one-half or greater.

After disconnection as illustrated in FIG. 4, one of the ends, such as 16, of connecting element 12 unexpectly remains attached to insert 14 even though the insert was extended equidistantly into the ends 16—16'. As a result, the coupling device 10 can be conveniently reconnected after separation, thus loss of the insert element is practically prevented.

The coupling device of FIG. 2 employs an external connecting element 12 formed of a material capable of bending into a ring. The connecting element is sufficiently flexible around the end located bore 20 so that a compressional force during assembly of the coupling device 10 results in a slight transverse enlargement to enable the element 12 to readily fit over the element 12. The stretchy resilient character of the material for insert 14 is further sufficient to assure a slight visually difficult to discern contractional effect of the external element 12 when the coupling device 10 is being disconnected.

The insert 14, instead of having flexibility of the connecting element 12, has sufficient rigidity so that the insert 14 can withstand the contractional force encountered during disconnection and assure enhanced frictional coupling. The hardness of the insert 14 is thus higher than that of the connecting element 12.

When the elements 12, 14 of the coupling device 10 are formed of a vinyl plastic material, the hardness of the materials is preferably in the range of from about 70 to about 100 durometers for the insert element 14 and from about 50 to about 80 durometers for the more flexible and less rigid connecting element 12. Furthermore, the relative hardness between the two elements is selected sufficiently different to preserve a difference of at least about 10 up to about 50 durometers. In a preferred example for a coupling device formed of vinyl elements, the insert element 14 has a durometer hardness of about 95 while the durometer hardness for the connecting element 12 is about 60 durometers.

The tapering of the insert element 14 at its ends 18 facilitates entry into the ends 16 of the external element 12. The insert 14 is a tubular section cut to form similarly shaped converging beveled ends 18 leaving a central cylindrical region 32 of sufficient length, L, to assure high frictional engagement with the wall 20 of the connecting element 12.

With insert ends 18 beveled in the manner shown in FIG. 1, a distinct advantage is provided with regard to separating the joined coupling. With the beveled insert 14 positioned as in FIG. 2, the coupling may be most readily separated by pushing outward with an instrument such as a pencil or pen barrel or a thumb nail in the direction of arrow 31 against the juncture between ends 16—16'. This method of separation can be accomplished with generally less than half the force required to pull the coupling apart longitudinally in the manner of FIG. 3.

The length of the cylindrical region 32 may vary for different connecting strengths. However, if the length, L, is too great, the strength of the coupling is too large and an excessively large force is needed to separate the coupling device. Such force could break the more flexible outer connecting element 12. On the other hand, when the length, L, is too short, the retaining strength of the coupling device 10 is small and its inadvertent disconnection may occur.

Another factor which affects the connected strength of the coupling device 10 is the extent of the oversize of the cylindrical section 32 of the insert 14 relative to the cross-sectional size of the bore 20 of the connecting element 12 into which the insert 14 is to be placed. Generally, the amount of oversize is made sufficiently small so that the push-on force required to connect the coupling device is not excessively high. On the other hand, if the insert is too small, the frictional coupling is too light. Since precisely dimensioned tubular vinyl extruded plastic materials are not available, the amount of oversize is chosen to assure proper frictional coupling engagement, and to compensate for dimensional manufacturing inconsistencies. Generally, the insert's diameter oversize may be from about 0.0005 inches to about 0.040 inches (0.5 mil to 40 mil). Preferably, however, the diameter oversize is about 15 mils to assure a reasonably snug fit of the insert 14 inside the connecting element 12.

When an oversize of 15 mils is employed, the material yields slowly and achieves a semi-permanent set, so as to effectively result in a functionally optimum oversize of about 5 mils. Heating the assembled coupling or connecting element alone prior to assembly to a temperature of about 90° C. rapidly accelerates this yielding process. Some return to the original oversize of 15 mils may occur if the coupling is left disconnected for a long period of time.

The softness of the connecting element 12 permits one to use the oversized insert element 14 whose placement inside an end 16 of the connecting element causes the slight enlargement at 24 over the insert 14. This enlargement may vary depending upon the interference fit between the insert element 14 and the connecting element 12.

The release force needed to disconnect the coupling device 10 generally is substantially greater than the force needed to connect the coupling device. The magnitude of the release force tends to be sensitive to the amount of time that the vinyl elements have been coupled. For example, after 10 seconds a vinyl coupling device as illustrated in FIGS. 1 through 4 required a release force of about 5 pounds, which after 5 minutes, increased to six pounds and after 24 hours to about eight pounds. However, the force can also be quickly restored by simply applying suitable lateral compressional finger pressure to the joined insert and connecting elements.

The effectiveness of the coupling device in accordance with the invention can be further appreciated with reference to the embodiments shown in FIGS. 5 and 6. Therein a tubular vinyl connecting element 40 is employed with a wall 41 whose thickness, W, is substantial in comparison with the diameter, D, of the inner bore 42. In that case the outer connecting element 40 may have the same durometer hardness as in the example of FIGS. 1 through 4, but the larger wall thickness increases the stiffness. When a short bending radius is employed to form a ring with a connecting element 30, the thickwalled connecting element ends 44 may not neatly mesh, leaving a gap 43. This gap can be advantageously employed to insert a tool or finger nail to aid the disconnection of the coupling. This method for disconnection tends to compress and expand the ends 44 (rather than elongation with contraction), thus facilitating disconnection of the coupling.

The variation in thickness of connecting element 12 can be appreciated. For example, a vinyl tube 12 for the coupling embodiment of FIGS. 1 through 4 has been used wherein the diameter of bore 20 was 0.125 inches and the wall thickness about 1/32 of an inch. In the embodiment of FIGS. 5 and 6 the wall thickness was doubled to 1/16 of an inch with the same bore size of ⅛ of an inch. In these embodiments the insert element 14 had a cylindrical region length, L, of about ¼ inch.

A ring may be formed with a coupling device 10 as shown in FIG. 7 by employing a pair of couplings 10.1 and 10.2 at approximately diametral positions. The outer connecting element 12 is formed of a pair of flexible material tubes which are connected with a pair of inserts 14.

In FIG. 8 the insert 14 is shown in an inverted position for a ring relative to that illustrated for the insert in previous figures. The insert element 14 still has the beveled end surfaces 18 but the shorter side is now facing an inward direction relative to the curvature for the outer connecting element 12. The security of the coupling is enhanced against abrupt upward pulls such as in the direction of arrow 30. In this respect the ease of disconnecting obtained as described with the orientation of insert 14 in FIG. 2 is not available.

In FIGS. 9 and 10 a coupling device 48 is shown using an insert 50 formed with a central cylindrical region 52 and tapered ends 54, 54'. The ends 54 taper slightly at a conical half angle $\alpha$ which is so selected that upon elongation or application of a release force 30 as illustrated in FIG. 10, the external connecting element 56 reduces the gaps 28 to the tapered ends 54 for increased frictional engagement. The tapered ends of insert 50 enable use of a relatively weak connecting force in comparison with a greater release force. The insert 50 may be formed of a solid vinyl or metal. The range for the conical half angle $\alpha$ may be from about 0.5° to about 15°.

Figure 11:
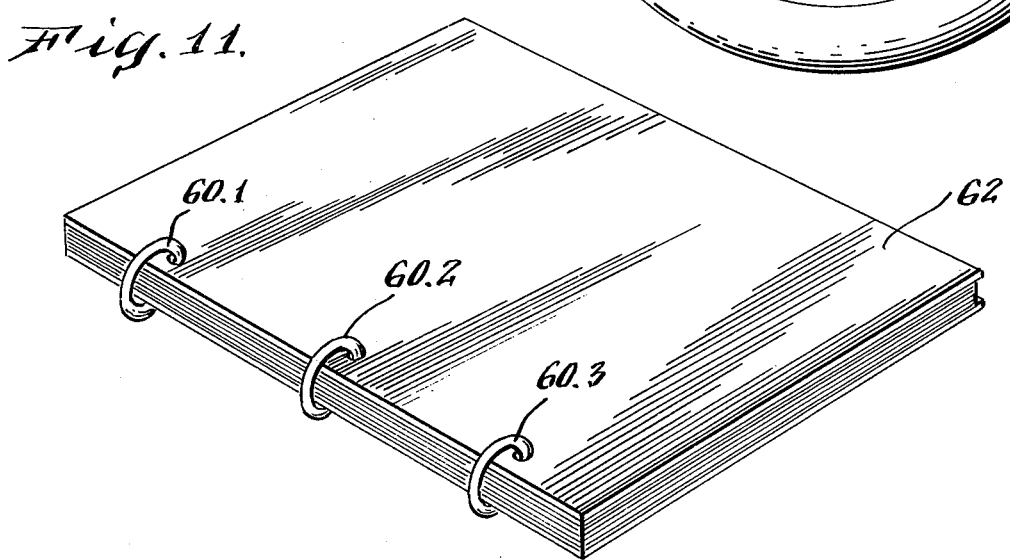
FIG. 11 is a perspective view of a loose-leaf notebook assembled with coupling devices in accordance with the invention.

The coupling device of this invention may be advantageously employed as three coupling rings 60 for a three ring loose-leaf paper binder 62 as shown in FIG. 11. Although the flexible coupling elements shown in the previous figures are suitable for such application, a more rigid form for a coupling device 64 as illustrated in FIG. 12 may be preferred. The coupling device 64 in FIG. 12 has a tubular insert element 14 provided with a stiffening member 66 in the form of a springy wire or stiff plastic rod which will reinforce the inner wall of the connecting element 12. This tends to prevent excessive bending of the ring 64 when used in an application such as the three ring notebook shown in FIG. 11. The stiffening element 66 may be sized to frictionally fit within the insert bore 68 and is of sufficient length to assure substantial circumferential support.

Figure 13:
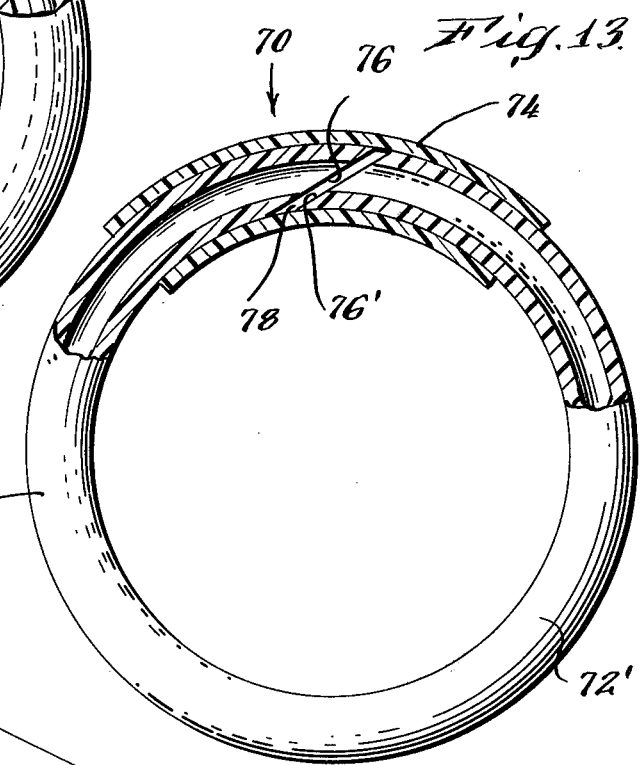
FIG. 13 is a partial circumferential section view of a rigid form for a coupling device in accordance with the invention.

FIG. 13 shows another form for a more firmly composed coupling device 70 which includes an insert element 72 and outer tubular connecting element 74 formed of vinyl materials as previously described. In coupling device 70 the insert 72 is substantially longer than the connecting element 74 and, in fact, of sufficient length to be bent into a ring as illustrated. The ends 76, 76' of the insert 72 are beveled as illustrated to enable their entry into the bore 78 of the softer connecting element 74 and the bevels are oriented to fit close to each other. The insert 72, being of a harder material than the connecting element 74, provides the desired rigidity and resistance against excessive bending so that it can be used as a ring binder as illustrated in FIG. 11.

The ring in FIG. 13 is shown formed with a single coupling 70 although it can be appreciated that two or more can be employed. The ends 80 of the connecting element 74 may be rounded or tapered to facilitate opening and closing of the pages in a loose-leaf notebook in which couplings 70 may be used.

Having thus described several embodiments for the coupling device in accordance with the invention, its advantages can be appreciated. Variations from the described embodiments can be made within the scope of the invention to be determined by the following claims.

What is claimed is:

1. A coupling device comprising
    an elongated outer element formed of a flexible, resilient, stretchable material having a hardness of at least 50 durometers, said outer element having a bore along at least one end portion thereof, said bore being bounded by a wall whose thickness is selected to exhibit sufficient resilience to obtain a self-reversible, cross-sectional area contraction of said end portion in response to a longitudinally applied tension force while exhibiting a self-reversible cross-sectional area increase of said end portion in response to a longitudinally applied compressional force; and
    an elongated insert including at least a first portion sized to have an interference fit with said bore, said insert being free of protruberances along its outer surface and being formed of a material substantially harder than that of said outer element for developing enhanced frictional surface engagement with the inner surface of said wall when the latter tends to contract in response to tensional force applied to separate the insert from the outer element;
    said outer element and said insert being made of materials having notably high surface friction when engaged with each other in the assembled state of the coupling device for resisting said applied tensional force and having considerably lower surface friction resisting entry of the insert into the bore of the outer element when the coupling device is being assembled, one of said elements being formed of vinyl.

2. The coupling device as claimed in claim 1, wherein the outer element and the insert are formed of vinyl material, having respectively lower and higher hardness as aforesaid.

3. The coupling device as claimed in claim 2 wherein the outer element is a flexible tube with a through bore.

4. The coupling device as claimed in claim 3 wherein the hardness of the vinyl material for the outer element is in the range of from about 50 to about 80 durometers.

5. The coupling device as claimed in claim 4 wherein the insert has both ends beveled to facilitate entry into the bore of said flexible tube.

6. The coupling device as claimed in claim 2 wherein the insert has tubular ends which are beveled to facilitate entry of the insert into said bore.

7. The coupling device as claimed in claim 2, wherein the outer element is a tube and has substantial length sufficient to be bent into a ring with a bore extending along the entire outer element;
    said insert being short relative to said outer element and sized to extend securely into the bore at each end thereof with said interference fit within the walls of said bore, to retain a ring shape.

8. The coupling device as claimed in claim 7 wherein the insert has oppositely sloping ends to facilitate entry into the bore of the outer element, said oppositely sloping ends developing a long side and a short side of the insert and the insert being disposed with its short side facing outward relative to the center of the ring shape when the insert is disposed in both ends of said tube for facilitating disconnection by means of radially outward pressure applied to the ring at the insert.

9. The coupling device as in claim 8, wherein the curvature of the outer element when formed into a ring with the insert in the bores causes separation between the surfaces of the bores and end portions of said long side of the insert so that, in case longitudinal tension is applied to the outer element between locations spaced from the ends of the insert, the outer element tends to straighten and force said end portions of said long side into frictional engagement with the bores, thereby increasing the security of the ring against opening when tension is applied as aforesaid.

10. The coupling device as claimed in claim 2 wherein the insert has substantial length and deformability sufficient to be bent into a ring;
    said outer element being short relative to the insert and each end of the outer element being provided with a bore sized for interference fit with the ends of the elongated insert;
    the length of the outer element being further selected to provide secure retentive engagement with the ends of the insert for the effective formation of a coupling device therewith.

11. The coupling device as claimed in claim 2 wherein the outer element is formed of greatly elongated tubular vinyl material bent into ring shape and having end surfaces transverse to the tubular axis, the end surfaces of the outer element being disposed to form a gap with the opposite end portions of the outer element forcibly assembled onto portions of the insert, the gap serving to receive a prying tool to overcome the secure retention of the insert in at least one end portion of said outer element.

12. The coupling device as claimed in claim 11 wherein the thickness of the wall of the tubular outer element is about one-half the diameter of the bore.

13. A coupling device as claimed in claim 1 wherein said bore is cylindrical and is of the order of 0.12 inch diameter and said insert has a cylindrical outer surface and its diameter is larger by no more than about 0.015 inch than said bore.

14. A coupling as claimed in claim 1 wherein said insert is a tubular element and has slanting end surfaces.

15. The coupling device as claimed in claim 1 wherein the insert has an end portion extending from said first portion which gradually decreases in cross-sectional area towards its free end.

16. The coupling device as claimed in claim 15 wherein said end portion of the insert element is conical and has a half-angle which is selected in relation to the contractability of the outer element for contraction of the outer element against the conical portion, in response to longitudinal tension, thereby developing enhanced frictional engagement between the insert and the outer element, while avoiding such enhanced frictional engagement when longitudinal compression is applied thereto when the insert is being forced into said bore.

17. The coupling device as claimed in claim 16 wherein the conical half angle is between about 0.5° and about 15°.

18. The coupling device as claimed in claim 17, wherein the outer element is a tube and has substantial length sufficient to be bent into a ring with a bore extending along the entire outer element;

said insert being short relative to said outer element and sized to extend securely into the bore at each end thereof with said interference fit within the walls of said bore, to retain a ring shape.

19. A coupling device comprising first and second elongated tubular elements formed of flexible, resilient, stretchable material, each having a prominent tendency of becoming reversibly thicker in the direction transverse to applied compression and reversibly thinner in the direction transverse to applied tension, and each tubular element having a cylindrical bore, and an elongated insert having a cylindrical longitudinal outer surface defining a medial portion and partially defining opposite end portions free of protruberances, and the insert having slanting end surfaces intersecting the cylindrical longitudinal surface, said end surfaces slanting oppositely so as to form a long side and a short side along said cylindrical surface of the insert, the diameter of said cylindrical surface being greater than that of each said bore when the tubular elements are disassembled from the insert and said tubular elements being assembled to opposite end portions of said insert and to said medial portion thereof, thus forming an interference fit of said insert in said tubular elements.

said coupling device being relatively secure against separation by tension applied to said tubular elements but being readily separable by transverse thrust directed toward said long side of said insert.

20. A coupling device as claimed in claim 19, wherein said tubular elements are of vinyl material.

21. A coupling device as claimed in claim 20 wherein said tubular elements are end portions of a tube whose length is great enough to be bent readily into ring shape.

22. A coupling device as claimed in claim 20, wherein said insert has a hardness at least 10 durometers greater than that of said tubular elements.

23. A coupling device as claimed in claim 19, wherein said insert and said tubular elements are of vinyl material.

24. A coupling device as claimed in claim 23 wherein said tubular elements have a hardness of at least 50 durometers.

25. A coupling device as claimed in claim 19 wherein said tubular elements are portions of a tube whose length is great enough to be bent readily into ring shape, the short side of said insert being disposed radially inward relative to the ring shape, for enhancing the resistance of the coupling against opening in response to radially outward forces.

* * * * *